INVENTORS.
BYRON A. RUNDE.
WALTER J. LISHOCK.
BY
ATTORNEY.

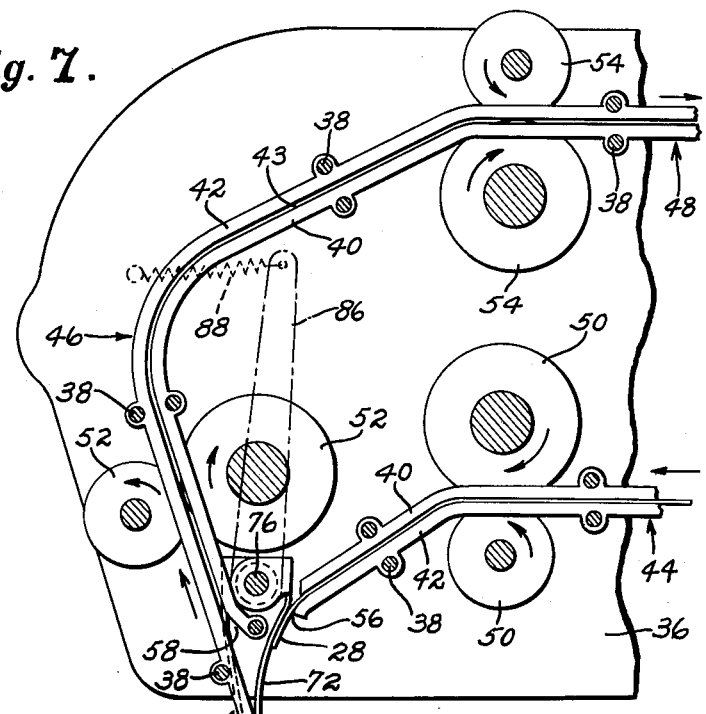
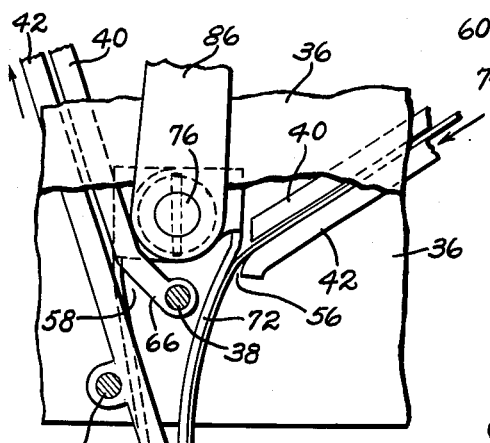
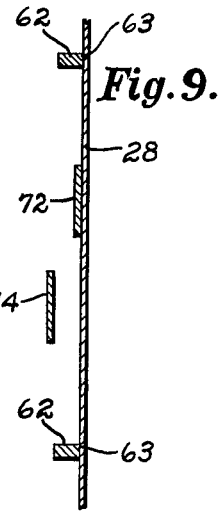
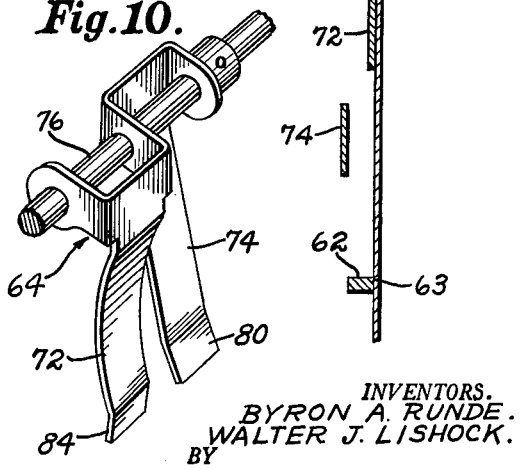

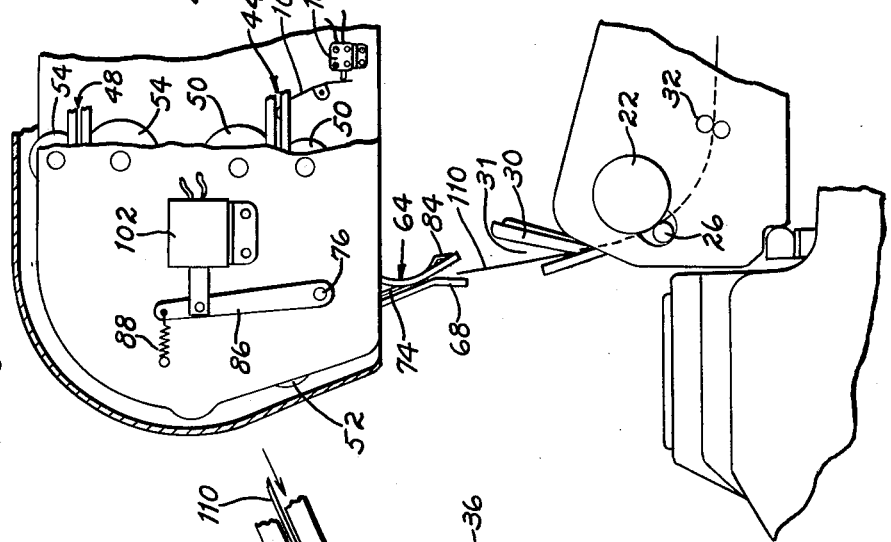
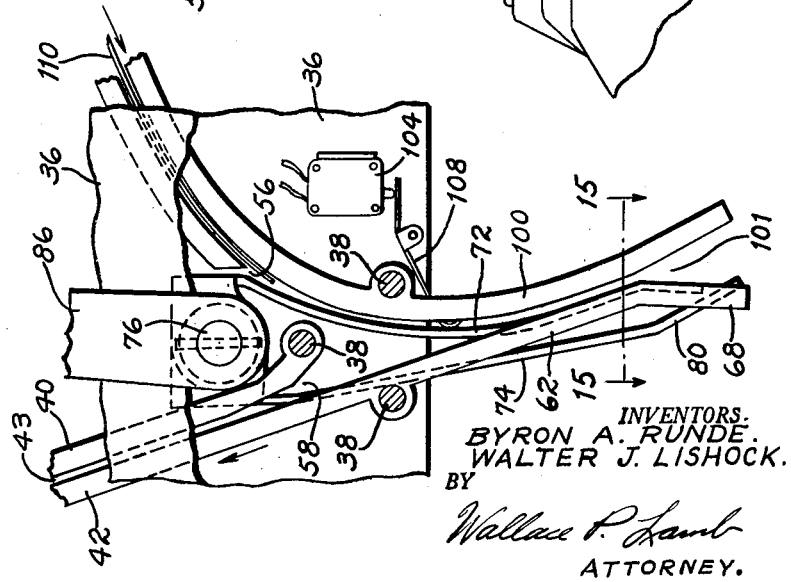

April 3, 1962 B. A. RUNDE ET AL 3,027,992
DOCUMENT GUIDE DEVICE
Filed Feb. 3, 1960 6 Sheets-Sheet 6
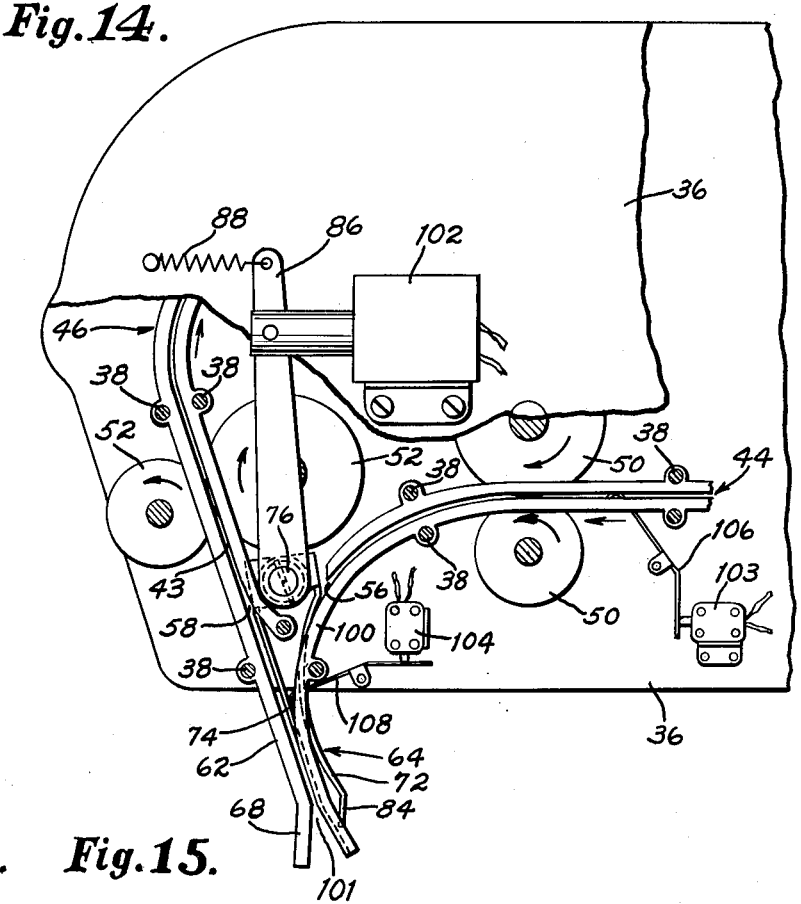
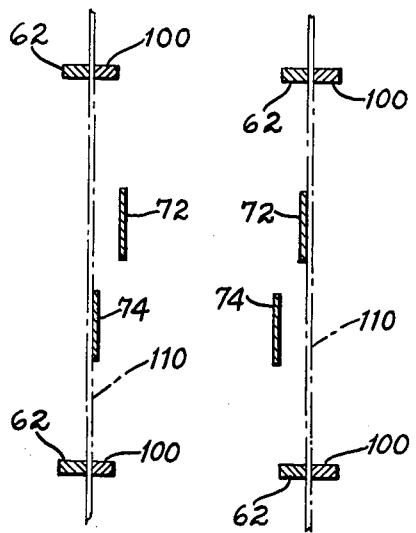
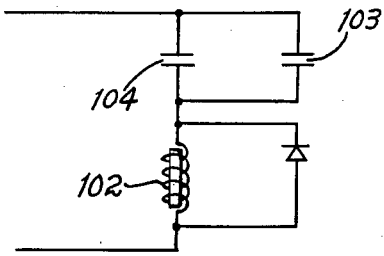
INVENTORS.
BYRON A. RUNDE.
WALTER J. LISHOCK.
BY
*Wallace P. Lamb*
ATTORNEY.

United States Patent Office 3,027,992
Patented Apr. 3, 1962

3,027,992
DOCUMENT GUIDE DEVICE
Byron A. Runde, Farmington, and Walter J. Lishock, Detroit, Mich., assignors to Burroughs Corporation, Detroit, Mich., a corporation of Michigan
Filed Feb. 3, 1960, Ser. No. 6,466
11 Claims. (Cl. 197—128)

This invention relates generally to a document transporting system and particularly to a sheet guideway device therefor.

It is an object of the invention to provide a sheet guideway device for guiding a sheet from a main guideway into the sheet holder or carriage of an accounting machine and also for guiding the sheet in substantially the reverse direction back into the main guideway.

Another object of the invention is to provide a unitary sheet guideway device having alternately formable, substantially oppositely directed guideways including a common exit-entrance for communication with an accounting machine and communicable with either the outlet or inlet of a main sheet guideway.

More specifically, it is an object of the invention to provide a sheet guideway device including pivotal guide members that intersperse with stationary guide members to form one or the other of a pair of guideways and a common exit-entrance for the guideways.

Another object of the invention is to provide a bi-directional sheet guideway device including a pivotal sheet deflector that is constructed and arranged so as to pivot to one of its guideway forming positions without need of an actuator other than a stiff sheet or card fed against the deflector, enroute to the accounting machine carriage.

A further object of the invention is to provide an improved bi-directional guideway device for guiding sheets of a wide range of stiffness and flexibility.

Other objects of the invention will become apparent from the following detail description taken in connection with the accompanying drawings in which:

FIG. 7 is a view similar to FIG. 4 showing the guide device guiding a sheet in one direction;

FIG. 8 is an enlarged fragmentary view similar to FIG. 5;

FIG. 9 is a cross sectional view, taken along the line 9—9 of FIG. 8;

FIG. 10 is a perspective view of a part of the sheet guideway device;

FIG. 11 is a view similar to FIG. 1 showing a modification of the sheet guideway device;

FIGS. 12 and 13 are fragmentary vertical sectional views of certain parts of the modification;

FIG. 14 is an enlarged side view partly broken away and in section of a sheet transport system having our modified sheet guideway device associated therewith;

FIGS. 15 and 16 are horizontal cross sectional views, taken respectively along the lines 15—15 and 16—16 of FIGS. 12 and 13, and FIG. 17 is an electrical circuit diagram for certain controls for the modified sheet guideway device.

Figure 1:
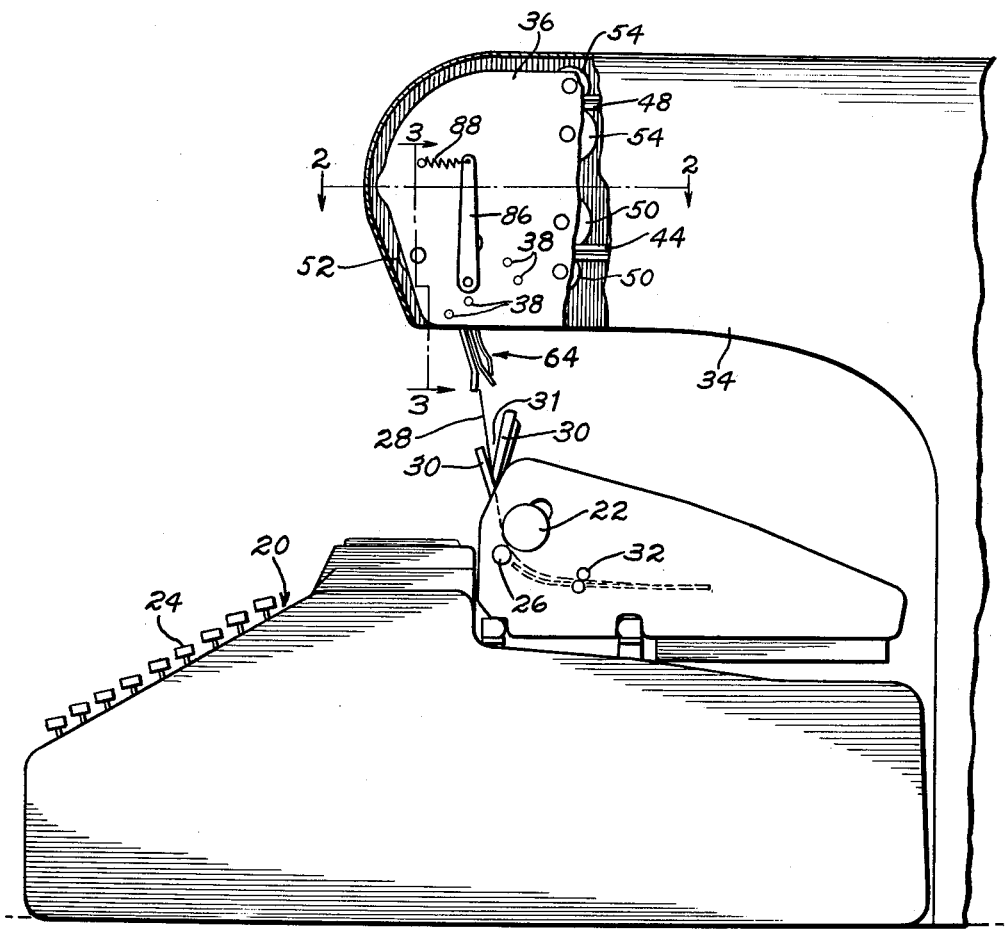
FIG. 1 is a side view partly broken away of an accounting apparatus embodying features of the invention.
Figure 2:
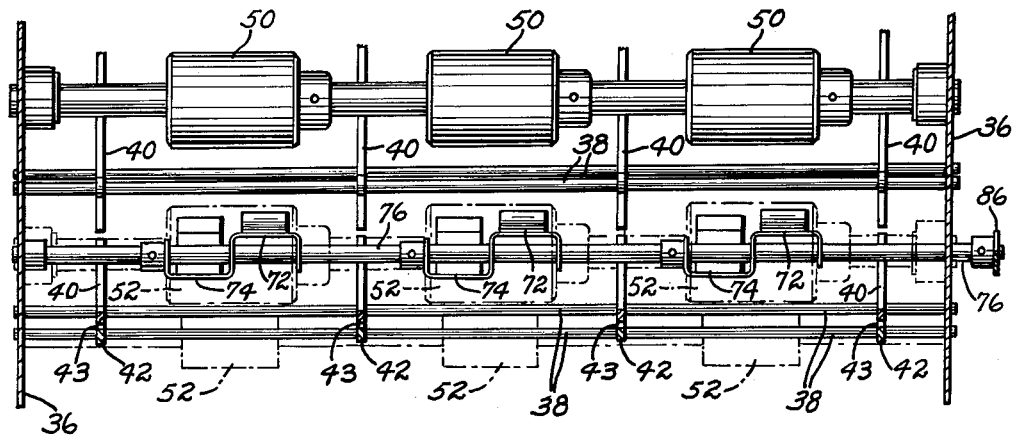
FIG. 2 is a horizontal sectional view taken along line 2—2 of FIG. 1, showing our sheet guide device in plan.
Figure 3:
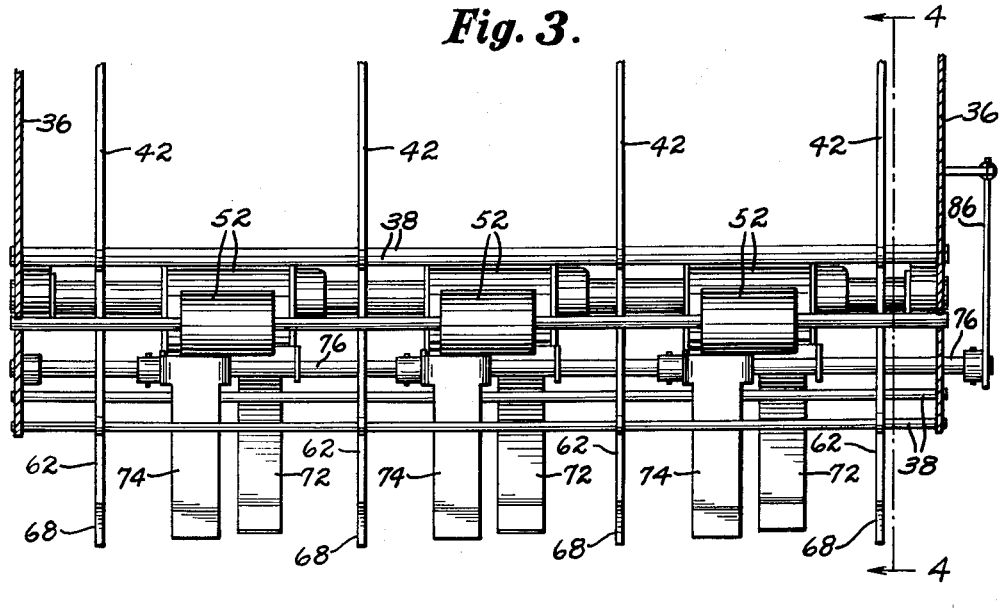
FIG. 3 is a vertical sectional view taken along line 3—3 of FIG. 1, showing the sheet guide device in elevation.

In FIG. 1 there is shown a business or accounting machine, designated generally by the numeral 20, which has the usual rotatable printing platen 22 and keyboard 24. Associated with the platen 22 are axially spaced pressure rollers 26 that cooperate with the platen to provide a holder for a document, such as a record card or ledger sheet 28. Mounted above the platen 22 are spaced apart guide plates 30 that form a throat 31 to receive and guide a card downwardly to the platen 22. The platen 22 is mounted so as to be movable upwardly and rearwardly of the pressure rollers 26 to a retracted position so that a card can be moved freely between the platen and rollers. The platen 22 is moved to its retracted position just before a card is to be removed from the platen and remains retracted to receive the next card to be processed by the machine. Below and rearwardly of the platen 22 there is a pair of driven rollers 32 which are adapted when the platen 22 is in retracted position, to feed a card downwardly between the platen 22 and rollers 26 and/or to feed a card upwardly out of the guide throat 31, the rollers being reversible in direction of rotation. The mechanism for retracting the platen 22 at the proper time, and the mechanism for driving and controlling the direction of feed of the rollers 32 is not shown or described since such mechanisms are well known and form no part of the present invention. For a detailed description of the above mentioned mechanisms and controls therefor, reference may be had to the co-pending application of William W. Deighton et al., Serial Number 598,454, filed July 17, 1956 and assigned to the same assignee as the present invention.

Overhanging the platen 22 is one end of a card transport apparatus 34, the construction of which includes supporting means, such as oppositely disposed side plates 36 connected together by transverse rods 38. Mounted on the rods 38 between and parallel to the side plates 36 there is a number of horizontally spaced rail structures each of which comprises an inner rail member 40 and an outer rail member 42. The inner and outer rail members 40 and 42 of each of the structures have opposed edges spaced apart, as at 43, a distance slightly greater than the thickness of the sheets or cards to be used and collectively form a main card guideway including a lower horizontal portion 44, a loop portion 46, and an upper horizontal portion 48. Cards are fed along the main card guideway 43 in the direction of the arrows by suitably spaced pairs of driven rollers including rollers 50, located near the juncture of the lower guideway portion 44 and the loop portion 46, rollers 52 located on the loop portion, and rollers 54, located at the juncture of the loop portion 46 and the upper portion 48 of the guideway.

Intermediate the card feed rollers 50 and 52, the main guideway 43 is interrupted to provide an outlet 56 for passage of a card out of the main guideway into the platen guide throat 31, and to provide an inlet 58 for re-entry of the card into the main guideway after the card has been processed by the machine.

Figure 6:
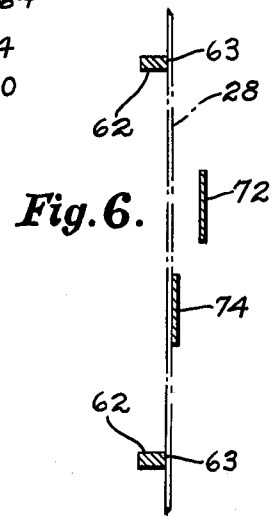
FIG. 6 is a cross sectional view, taken along the line 6—6 of FIG. 5.

In accordance with the invention, there is provided a bi-directional card guideway device 60 located at the interruption of the main guideway 43 to guide a card from the main guideway 43 to the platen throat 31 and also to guide the card in a substantially reverse direction back into the main guideway. The card guideway device 60 comprises in general a plurality of laterally spaced stationary guide members 62 and a deflector member 64. Preferably the stationary guide members 62 are extensions of the outer guide rails 42, the stationary guide members extending downwardly from the card inlet 58. Inwardly disposed edge surfaces 63 of the stationary guide members 62 are coplanar or aligned transversely and collectively form a part of a sheet guideway 70, as shown in FIG. 6. At the inlet 58, the inner guide rails 40 are flared outwardly, as at 66, to pilot a card into the inlet. Similarly, the lower ends of the stationary guide members 62 are flared outwardly, as at 68, to form a portion of a flared entrance to the card guideway 70, the guideway being formed by the stationary guide members 62 and the deflector member 64 as will hereinafter be more fully understood.

Figure 4:
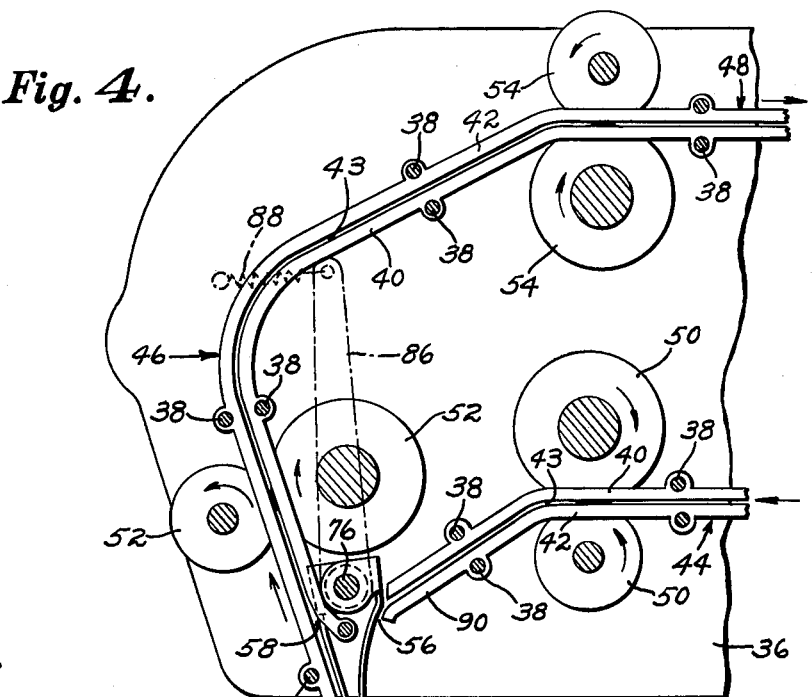
FIG. 4 is an enlarged vertical sectional view taken along line 4—4 of FIG. 3 showing part of a sheet transport system and the sheet guide device associated therewith.
Figure 5:
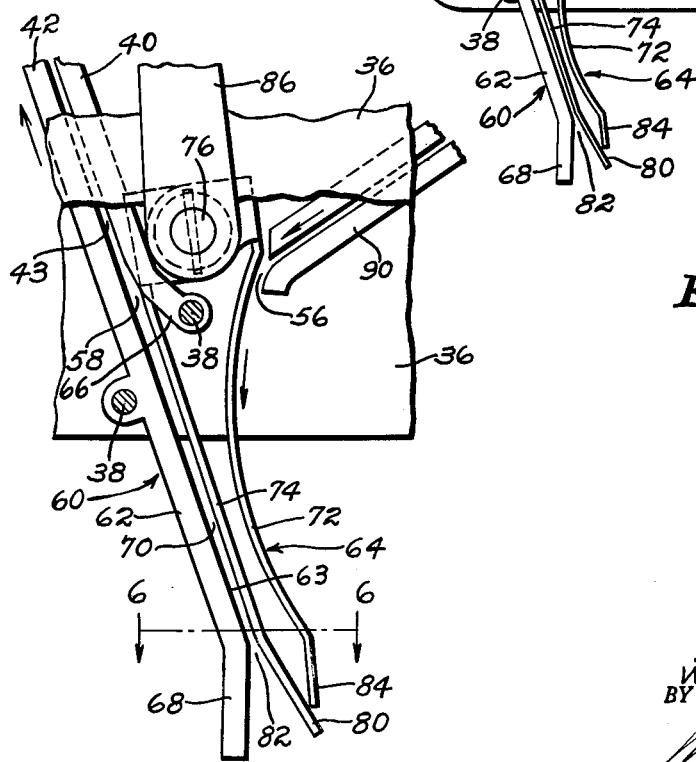
FIG. 5 is an enlarged side view of the sheet guideway device and fragment of the sheet transport system.

The card deflector member 64 is mounted on the side plates 36 between the outlet 56 and the inlet 58 of the main guideway 43 and comprises a number of sheet metal vane members 72 and a number of other sheet metal vanes 74. The vanes 72 and 74 are fixed to a transverse shaft 76 that extends between and is journalled for rotation on the side plates 36, and the vanes extend downwardly from the shaft in the general direction of the platen throat 31, as shown in FIG. 1. Also, the vanes 72 and 74 are alternately arranged in spaced apart relation along the shaft 76, the vanes 74 being flat vanes that are in alignment or coplanar in a direction axially of shaft 76 and offset laterally from vanes 72. Vanes 72 are also in alignment or coplanar in a direction axially of shaft 76, but curve downwardly from the outlet 56 presenting concave guide surfaces facing oppositely from the outer or guideway forming surfaces of the flat vanes 74. As shown in FIG. 10, the vanes 72 and 74 may be formed in pairs comprising one of each of the vanes integrally formed together of sheet metal or other suitable material. At their lower edges, the vanes 74 have outwardly bent end portions 80 in alignment with each other and adapted in one position of the deflector member 64 to form a flared card entrance 82 with portions 68 of the stationary guide members 62, as shown in FIGS. 4 and 5. Also, lower end portions 84 of the curved vanes 72 are bent outwardly to align with the end portions 68 of the stationary guide members 62 in the position of the deflector member 64 shown in FIG. 8.

An operating lever 86 for the deflector member 64 is fixed to an outer end of shaft 76 and extending upwardly therefrom has its upper end attached to a coil spring 88 that is anchored at one end to the adjacent side plate 36. The spring 88 normally holds the deflector member 60 in the position shown in FIGS. 4, 5, and 6, forming the card guideway passage 70 to establish communication between the platen throat 31 and the re-entry inlet 58 to the main guideway 43. Preferably end portions 90 of the main guideway are inclined downwardly to the outlet 56 at an acute angle to the horizontal so that a card being fed out of the outlet 56 will engage the curved surfaces of the vanes 72 with a component of force to pivot the deflector member 64 against the opposing action of spring 88 to the position shown in FIGS. 7 and 8. To move the deflector member 64 to the position shown in FIGS. 7 and 8, the stiffness of the card must be, of course, sufficient to overcome a spring force that is adequate to effect return of the deflector member 64 to normal position.

In operation, a card is fed along the lower leg 44 of the main guideway 43 by feed rollers including the rollers 50 which feed the card down the inclined portion 90 of the guideway and then against the deflector member 64, pivoting the deflector member to the position shown in FIGS. 7 and 8. In this position of the deflector member 64 the vanes 72 and 74 thereof intersperse with or position between the stationary guide members 62 in staggered relation such that lower portions of the curved vanes 72 align with lower portions of the guide members 62 in cooperation to form a guideway leading down from the outlet 56 toward the platen throat 31, as shown in FIGS. 7, 8, and 9. When the card leaves the lower end of the deflector member 60, the deflector member is free to swing back to its normal position or position shown in FIGS. 4 and 5. In this position, the vanes 74 have their outer flat faces in spaced relationship to the opposed edges of the stationary guide members 62 to cooperate therewith collectively in providing guideway 70 in communication with the inlet 58 to the main guideway 43. After the record card has been processed by the machine 20, the rollers 32 function to feed the card upwardly out of the machine, the card passing through the entrance 82 and up the guideway 70 into the bight of the rollers 52 which then feed the card to rollers 54, etc., until the card reaches a desired destination, such as a stacker (not shown).

The modification of FIGS. 11 to 17 is similar to the above described sheet guideway device and therefore like parts have been designated by like reference characters to avoid unnecessary repetitious description. The modification is adapted for the guiding of documents, such as thin pliable sheets or sheets of insufficient stiffness to actuate the deflector member 64. In order to guide such sheets to and away from the platen 22, additional stationary guide members 100 are provided and arranged in laterally spaced relation opposite the stationary guide members 62 as seen, for example, in FIGS. 15 and 16. Preferably, the guide members 100 are extensions of the rails 40, the guide members extending downwardly from the outlet 56 and having preferably the same curvature as the vanes 72 of the card deflector member 64. The stationary guide members 62 and 100 cooperate in the forming of a chute that communicates with both the sheet outlet 56 and inlet 58 of the main guideway 43 and tapers downwardly therefrom to a relatively small exit-entrance 101 which may be arranged in registry with the throat 31 of the platen 22. In the normal position of the sheet deflector member 64, shown in FIG. 13, the deflector member vanes 72 and 74 intersperse or position in staggered relationship between the stationary guide members 100, and lower portions of the flat vanes 74 align and cooperate with lower portions of the stationary guide members 100 to form the guideway 70 and exit-entrance 101.

Connected to the operating lever 86 of the deflector member 64 is an actuator or solenoid 102 under the control of spaced apart sheet actuated switches 103 and 104. The switch 103 is mounted on the main guideway structure preferably adjacent the feed rollers 50 and has a pivotal operating arm 106 that projects into the main guideway for actuation by a sheet enroute to outlet 56. The switch 104 may also be mounted on the main guideway structure and has a pivotal operating arm 108 below outlet 56 that projects into the path followed by the sheet as it travels downwardly toward the exit-entrance 101 of the guideway device. The switch operating arms 106 and 108 are spaced apart a distance such that the leading edge of a sheet 110 will close switch 104 while the sheet is still holding switch 103 closed. The switches 103 and 104 are in parallel circuit as shown in FIG. 16 so that when either switch is closed the solenoid 102 will be energized. When the solenoid 102 is energized, the sheet deflector 64 is pivoted thereby to the position shown in FIG. 12 whereupon the curved surfaces of the deflector vanes 72 and the curved edges of the guide members 100 form a guideway establishing communication between the outlet 56 and the exit-entrance 101 to guide the sheet downwardly to the platen 22.

From the foregoing description it will now be appreciated that we have provided an improved sheet guide device for guiding a record sheet or card from a main guideway to an accounting machine platen and also for guiding the sheet or card away from the platen in substantially the reverse direction back into the main guideway. It will also be appreciated that the interspersing feature of the guideway members makes it possible to form either one or the other of the two guideways using portions of each of the guide members in both instances and without forming any card obstructions within either of the guideways. Furthermore, we have provided an improved bi-directional guideway device in which a card deflector is card actuated. In addition, we have provided a modified sheet guide device which is capable of guiding thin flexible paper sheets and/or relatively thick, bendable cards, as desired.

While we have shown and described the invention in considerable detail, it will be understood that many variations may be made therein without departing from the spirit and scope of the invention.

What is claimed is:

1. A bi-directional sheet guideway device for guiding a sheet along a path of travel in one direction and for thereafter guiding the sheet along a path of travel in substantially the opposite direction comprising supporting means, stationary guide members in spaced apart coplanar relation and collectively forming part of a sheet guideway for the second path of travel and also forming part of a sheet inlet for the guideway, and a plurality of sheet guide members oppositely disposed to said stationary guide members and pivotal collectively on said supporting means between two positions, said second guide members, disposed anterior to said stationary guide members with respect to the direction of travel of the sheet, said pivotal guide members in one position interspersed with said stationary guide members forming therewith a guideway for travel of the sheet in the one direction and in the other position spaced from said stationary guide members to form therewith the other sheet guideway and inlet thereto.

2. A bi-directional sheet guideway device for guiding a sheet along a path of travel in one direction and thereafter guiding the sheet along a path of travel in substantially the reverse direction comprising supporting means, stationary guide members in spaced apart coplanar relation forming part of a sheet guideway and part of an inlet to the guideway, and a plurality of collectively pivotal guide members pivoted on said supporting means in lateral relation to said stationary guide members and pivotal between two positions, said pivotal guide members staggered relative to said stationary guide members for interspersement therewith and alternate ones of said pivotal guide members coplanar and cooperable in one of said positions with portions of said stationary guide members to form a guideway for guiding the sheet in the one direction, and the other ones of said pivotal guide members coplanar and offset transversely for cooperation in the other of said positions to form the other part of the first mentioned guideway and inlet thereto.

3. A bi-directional sheet guideway device for guiding a sheet along a path of travel in one direction and thereafter guiding the sheet along a path of travel in substantially the opposite direction comprising supporting means, stationary guide members in spaced apart coplanar relation forming part of a sheet guideway and inlet thereto, and a plurality of collectively pivotal vane members pivotal between two positions about an axis on said supporting means and in staggered relation to and for interspersement with said stationary guide members, alternate ones of said pivotal vane members having concave surfaces cooperable with portions of said stationary guide members in one of said positions to form a second sheet guideway, and the other of the pivotal vane members having flat surfaces opposite to the concave surfaces and cooperable with said stationary guide members in the other of said positions to form the other part of the first guideway and inlet thereto.

4. A bi-directional sheet guideway device for guiding a sheet along a path of travel in one direction and thereafter guiding a sheet along a substantially reverse path of travel comprising supporting means, a plurality of spaced apart coplanar guide members fixed to said supporting means, a second plurality of spaced apart coplanar guide members fixed to said supporting means and respectively oppositely disposed to said first plurality of guide members, said first and second pluralities of guide members cooperating to partially form a guideway tapering downwardly from a relatively large throat to a relatively small exit-entrance for the sheet, and a sheet deflector member pivotal between two positions on said supporting means and between said first and second guide members, said deflector member having lower spaced apart extended portions in staggered relation to said first and second guide members to intersperse therewith in said positions respectively, said extended portions of said deflector member in one position interspersing with the second guide members to cooperate with the first and form a guideway and a portion of the common exit-entrance for guiding the sheet downwardly and in the other position interspersing with said first guide members to cooperate with the second to form a second guideway and a portion of the common exit-entrance.

5. In a card guideway system, supporting means, a main guideway having an outlet and an inlet intermediate the ends of the guideway, a card holder, a guideway device between said holder and the inlet and outlet of said main guideway including a pivotal guide member pivotal between two positions, said guide member having a concave side to direct the card from said outlet to said holder in one of said positions and having an opposite side to direct the card from said holder to said inlet when said guide member is in the other of said positions, said outlet positioned to direct the leading edge of the card against the concave surface of said guide member to pivot said guide member to said one position, and a spring urging said guide member to the other of said positions.

6. In a card guideway system, a main sheet guideway interrupted intermediate its ends to provide a sheet outlet and a sheet inlet, a business machine sheet holder below said inlet and outlet, stationary sheet guide means having an upwardly directed throat in communication with both said outlet and said inlet and having a common exit-entrance directed toward said holder, a pivotal sheet deflector member within said guide means cooperable in one position to direct a sheet downwardly from the outlet of the main guideway to the common exit-entrance and in a second position to direct a card upwardly from the common exit-entrance to the inlet of the main guideway, means operable to actuate said deflector member in response to the approach of a sheet to said outlet, and means operable to feed the sheet from said holder into said common exit-entrance upwardly through said throat.

7. In a sheet transporting system, a sheet holder for an accounting machine, a main sheet guideway extending above said holder having a downwardly directed outlet for a sheet enroute to the holder and a downwardly directed inlet for re-entrance of the sheet to the main guideway from said holder, means to feed the sheet out of said main guideway outlet toward said holder, means to feed the sheet from said holder toward the inlet to said main guideway, guideway means including a sheet deflector member interposed between said main guideway and said holder having an upper end in communication with both the outlet and the inlet of said main guideway and a lower exit-entrance in communication with said holder, said deflector member movable to a position to guide the sheet downwardly to the exit-entrance and to a second position to guide the sheet upwardly to the inlet of said main guideway, and a sheet actuated switch controlling said deflector member.

8. A bi-directional sheet guideway device for guiding a sheet along a path of travel in one direction and thereafter guiding the sheet along another path of travel in a substantially reverse direction comprising supporting means, stationary guide members in spaced apart coplanar relation and collectively forming part of a sheet guideway and also part of a common exit-entrance of the paths of sheet travel, a first set of guide members in relative coplanar relation and spaced apart in staggered relation to said stationary guide members, said first set of guide members pivotal on said supporting means to a first position interspersed coplanar with said stationary guide members to form the guideway and also part of the common exit-entrance and pivotal to a second position, and a second set of guide members in relative coplanar relation and spaced apart in staggered relation to said stationary guide members and offset laterally from said first set of guide members, said second set of guide members pivotal with the first set of guide members on pivoting of the latter to said second position forming a second guideway with said stationary guide members and part of said exit-entrance.

9. A bi-directional sheet guideway device for guiding a sheet along a path of travel in one direction and thereafter guiding the sheet along a path of travel in a substantially reverse direction comprising supporting means, stationary guide members in spaced apart coplanar relation and mounted on said supporting means, a first set of guide members in relative coplanar relation and spaced apart in staggered relation to said stationary guide members, said first set of guide members pivotal on said supporting means from a first position forming one guideway with said stationary guide members to a second position interspersed with said stationary guide members, and a second set of guide members in relative coplanar relation and spaced apart in staggered relation with said stationary guide members, said second set of guide members offset laterally from said first set of guide members and cooperating with said stationary guide members to form a second guideway when said first set of guide members are interspersed with said stationary guide members.

10. A bi-directional sheet guideway device for guiding a sheet along a path of travel in one direction and thereafter guiding the sheet along a second path of travel in a substantially reverse direction comprising supporting means, a first plurality of spaced apart coplanar guide members fixed to said supporting means, a second plurality of spaced apart coplanar guide members fixed to said supporting means and laterally positioned to said first plurality of guide members to form a guideway therebetween, a first set of spaced apart coplanar guide members pivotal collectively between two positions and said first and second pluralities of fixed guide members, said first set of pivotal guide members in staggered relation to and for interspersing with either of the pluralities of said fixed guide members, said first set of pivotal guide members in one of said two positions interspersed with said first plurality of fixed guide members forming with parts thereof and with said second plurality of fixed guide members a guideway for travel of the sheets in the one direction, and a second set of spaced apart guide members collectively pivotal with and laterally disposed to said first set of pivotal guide members, said second set of pivotal guide members in staggered relation to and interspersable with the guide members of either of the pluralities of fixed guide members, said second set of pivotal guide members in spaced relation to and forming a guideway with said first plurality of fixed guide members when said first set of pivotal guide members are in the other of their two positions.

11. A bi-directional sheet guideway device for guiding a sheet along a path of travel in one direction and for thereafter guiding the sheet along a path of travel in substantially the opposite direction comprising supporting means, stationary guide members in spaced apart coplanar relation and collectively forming part of a sheet guideway for the second path of travel and also forming part of a sheet inlet for the guideway, and a plurality of sheet guide members oppositely disposed to said stationary guide members and movable collectively on said supporting means between two positions, said movable guide members in one of said two positions interspersed with said stationary guide members forming therewith a guideway for travel of the sheet in the one direction and in the other of said two positions spaced from said stationary guide members to form therewith the other sheet guideway and inlet thereto.

References Cited in the file of this patent
UNITED STATES PATENTS

| | | |
|---|---|---|
| 2,086,945 | Pfeiffer | July 13, 1927 |
| 2,305,000 | Goodbar | Dec. 15, 1942 |
| 2,625,101 | Gammeter | Jan. 13, 1953 |